United States Patent [19]

Kerr

[11] Patent Number: 5,002,476
[45] Date of Patent: Mar. 26, 1991

[54] TOOLING FOR COMPOSITE PARTS

[75] Inventor: Andre B. Kerr, Glendale, Calif.

[73] Assignee: Lockheed Corporation, Calabasas, Calif.

[21] Appl. No.: 441,930

[22] Filed: Nov. 24, 1989

[51] Int. Cl.$^5$ .................. B29C 33/06; B29C 33/18
[52] U.S. Cl. ............... 425/174.004; 425/388; 425/405.1; 264/511; 264/257; 264/22; 249/134
[58] Field of Search .............. 264/22, 25, 102, 257, 264/258, 510, 511, 571; 156/99, 379.6, 380.9, 382; 249/134; 425/387.1, 388, 389, 390, 405.1, 405.2, 174, 174.4, 173

[56] References Cited

U.S. PATENT DOCUMENTS

| | | | |
|---|---|---|---|
| 3,773,638 | 11/1973 | Gotoh | 264/22 |
| 4,270,964 | 6/1981 | Flaskett | 264/510 |
| 4,311,661 | 1/1982 | Palmer | 264/510 |
| 4,360,483 | 11/1982 | Ayres | 264/2.7 |
| 4,562,033 | 12/1985 | Johnson | 264/510 |
| 4,576,776 | 3/1986 | Anderson | 264/510 |
| 4,608,220 | 8/1986 | Caldwell | 264/510 |
| 4,643,785 | 2/1987 | Paynton | 156/101 |
| 4,676,853 | 6/1987 | Lerma | 264/510 |
| 4,772,437 | 9/1988 | Reavely | 264/22 |
| 4,879,073 | 11/1989 | Kromrey | 264/22 |
| 4,915,896 | 4/1990 | Rachal | 264/511 |
| 4,948,539 | 8/1990 | Byers | 264/511 |

Primary Examiner—Jay H. Woo
Assistant Examiner—Jeremiah F. Durkin, II
Attorney, Agent, or Firm—Louis L. Dachs

[57] ABSTRACT

The apparatus includes a glass mold having opposed principle surfaces, the mold being generally transparent to infrared radiation, with one of the principle surfaces for receiving moldable materials. A stand supports the mold. Infrared heaters are positioned approximate to the opposite surface of the mold. An infrared radiation reflector is positioned behind the infrared heaters so as to reflect infrared radiation back toward the mold.

7 Claims, 1 Drawing Sheet

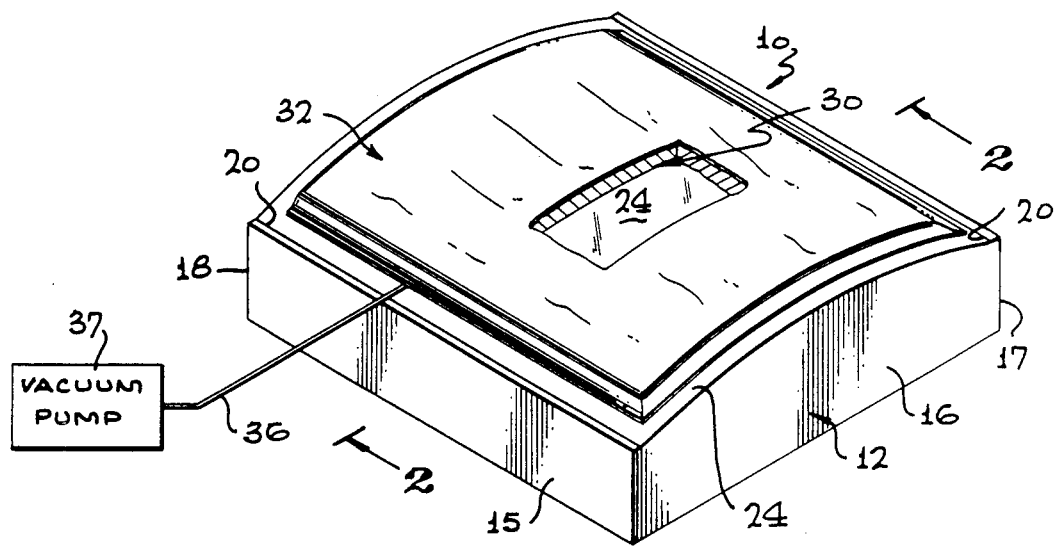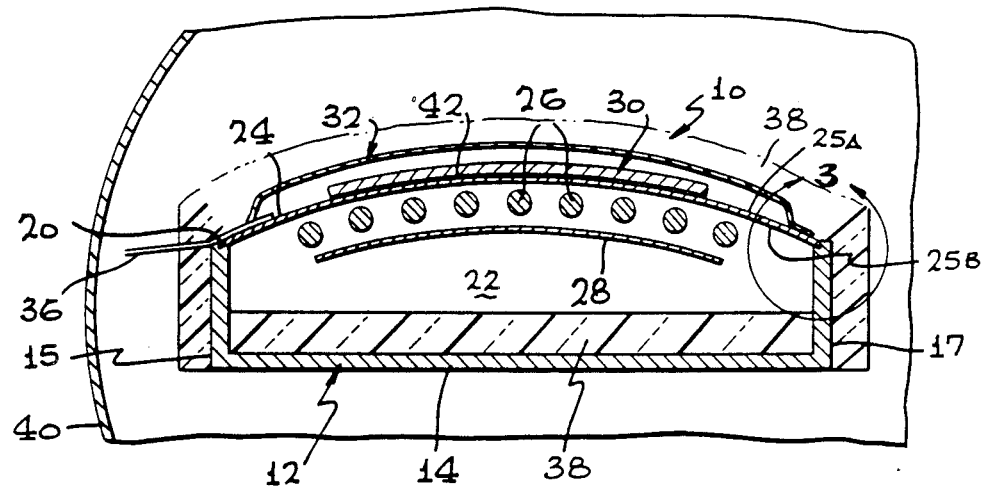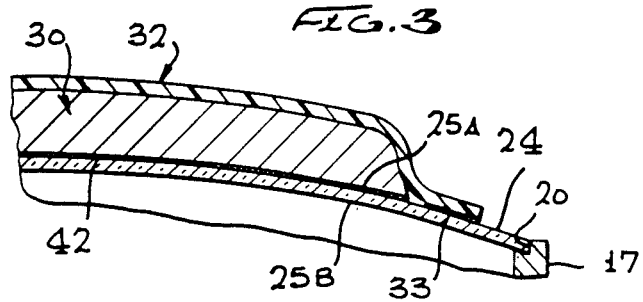

TOOLING FOR COMPOSITE PARTS

BACKGROUND OF THE INVENTION

1. Technical Field

The invention relates to the fields of apparatus and method of forming composite structures and, in particular, to the molding of articles using infrared heat.

2. Description of the Related Art

Composites parts typically comprise filamentary materials such as graphite or FIBERGLAS glass fiber within a thermoplastic or thermoset resin matrix. The type of filamentary material and orientation thereof as well as the type of resin used is dependent upon the design requirements of the article to be manufactured. The typical procedure for making such parts is to layup a multiple number of plies of the preimpregnated filamentary material on the surface of a mold. The layup is vacuum bagged by placing a layer of Polyimide film, Nylon or silicon rubber over the layup and sealing it to the mold about the periphery thereof forming an evacuatable envelope. During the sealing process a tube is installed so that a vacuum can be drawn from the envelope. When the vacuum is in fact drawn from the envelope atmospheric pressure compresses the layup. Higher pressure can be applied by use of an autoclave. Thereafter, the assembly is heated, in the case of thermosets to curing temperatures and when using thermoplastics to the melting point. Upon cooling, a homogeneous part results.

If the forming temperature is relatively low, around 350° F., then aluminum, steel or epoxy composite molds can be used. If the forming temperature is high, such as 700° F. required to melt a thermoplastic resin such as polyetheretherketone (PEEK), then more exotic ceramic or graphite tooling is required. A number of heating techniques can be used. For example, integral heating elements can be cast in a ceramic mold or the whole assembly can be placed in an autoclave and heated therein. The use of an autoclave would also allow an increase in the compaction pressure above atmospheric.

Glass tooling has been used in various manufacturing operations, for example, U.S. Pat. No. 4,360,483 "Apparatus for A Method of Pressing Plastic Sheets" by R. L. Ayres, discloses a method of press stretching and or press polishing of acrylic sheets. In this apparatus flat tempered glass plates are used to accomplish the press stretching or press polishing, the glass sheets being loaded by a conventional press. In U.S. Pat. No. 4,643,785 "Method of Manufacturing a Filter" by R. D. Paynton, a method is disclosed for making a filter for use in combination with a cathode ray tube screen. As part of the process for making the filter, a wire mesh impregnated with a thin layer of a bonding agent is joined to a translucent plastic sub strate. The bonding agent is first deposited on a piece of glass, and thereafter, the mesh is embedded therein. The substrate is then placed onto the mesh. The backside of the glass is illuminated so that any gaps in the bonding agent are exposed. Applicant is unaware of any other applications for glass tooling, and particularly, has not heretofore seen the use of glass tooling for the manufacture of composite parts.

Thus, it is a primary object of the subject invention to provide an apparatus for and method for forming composite parts.

It is another object of the subject invention to provide an apparatus for and method for making composite parts utilizing glass molds.

It is a further object of the subject invention to provide an apparatus for and method for making composite parts utilizing infrared heating techniques.

SUMMARY OF THE INVENTION

The invention is an apparatus for and method of making composite parts. In detail, the invention comprises a support. A glass mold is mounted on the support having opposed principle surfaces with one of the principle surfaces for receiving the layup and molding thereof. Ideally, the glass mold should be totally transparent to infrared radiation; however, from a practical standpoint of cost and availability, commercially available brand heat resistant glass is most often used. In proximity to the opposite surface of the mold are a plurality of infrared heating lamps. Preferably, below the heating lamps is a reflector which insures a maximum amount of heat being directed through the mold. Additionally, the mold is insulated to further reduce heat loss.

As previously mentioned, a typical layup would consist of a large number of plies with the filamentary material orientated as dictated by a particular design. Placed over the layup is a vacuum bag which is, typically, made of Nylon or silicon rubber. Polyimide fim is often used for high temperature thermoplastics. It is placed over and around the periphery of the layup and sealed to the one surface by means of a vacuum bag sealant tape forming an evacuatable envelope. During the sealing process, a tube is inserted between the edge of the vacuum bag and mold surface. This tube, in turn, is connected to a vacuum pump. If the moldable materials do not effectively absorb infrared radiation, such as KEVLAR aramide fiber reinforced composites, then the one principle surface can be coated with an infrared absorbing material such as carbon or graphite. A solution containing the carbon or graphite can be easily applied to the mold to coat the one principle surface and thereafter dried.

In operation, a vacuum is drawn from the envelope causing atmospheric pressure to compress the layup. Thereafter, the infrared heaters are turned on and, since the glass mold is generally transparent to the infrared radiation, most all of the radiation is absorbed by the layup. This, has the advantage over ceramic molds with cast in integral heaters, because, in the latter, the whole mold must be heated prior to the heating of the layup to forming temperatures. The assembly can also be placed in an autoclave or unheated pressure vessel and, additional pressure above atmospheric can thus be applied.

Therefore, it can be clearly seen that the method of molding comprises the following steps. 1) Providing a glass mold having opposed principles surfaces with the glass generally transparent to infrared radiation and with one of the principle surfaces for receiving the moldable materials. 2) Providing a stand for supporting the mold. 3) Laying up the moldable materials on the mold. 4) Vacuum bagging the layup forming an envelope thereabout which is evacuatable. 5) Drawing a vacuum from an envelope. 6) Heating the layup from the opposite side of the mold by means of infrared radiation until the layup is molded. If the moldable materials do not effectively absorb infrared radiation, then prior to the step of laying up the moldable materials, the step of coating the one principle surface of the mold with an infrared absorbing material is accomplished.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a perspective view of the apparatus for making composite parts partially broken away to show the interior thereof.

Illustrated in FIG. 2 is a cross sectional view of FIG. 1, taken along the line 2—2, particularly illustrating the infrared heating elements and reflector.

Illustrated in FIG. 3 is an enlarged partial view of a portion of FIG. 2 encompassed by the arrow 3, particularly illustrating the mounting of the glass mold in its support and also the method for sealing the vacuum bag to the mold.

DESCRIPTION OF THE PREFERRED EMBODIMENT

Referring to FIGS. 1-3, it can be seen that the apparatus, generally indicated by the numeral 10, comprises a support 12 having a bottom 14 and sidewalls 15, 16, 17, and 18. The top portion of the side walls 15 and 17 incorporate a notch 20. A glass mold 24 is mounted on the support with its ends restrained by the notches 20. The glass mold 24 has two opposed principle surfaces, a forming surface 25A and an interior surface 25B. Ideally, the glass mold should be totally transparent to infrared radiation; however, from a practical standpoint, of cost and availability dictates commercially available PYREX heat resistant glass glass. PYREX heat resistant glass glass has the added advantage in that it can be welded, just like metal structures, using a glass filler rod. Thus, extremely large molds can be built up from relatively small pieces of pyrex glass. Of course, grinding of the weld is required to obtain the smooth surface.

In proximity to the surface 25B of the mold 24 are a plurality of infrared heating lamps 26. Below the heating lamps is a reflector 28 which insures a maximum amount of heat being directed through the mold. A typical composite layup 30 is shown on the mold surface 25A. The only limitation on the type of composite materials that can be used is that they must absorb infrared radiation. As previously mentioned, a typical layup would consist of a large number of plies orientated as dictated by the particular design. The ideal composite material for use with this mold is a thermoplastic having a graphite filamentary material embedded therein. Placed over the layup is a vacuum bag 32, which is typically made of Polyimide film or Nylon or silicon rubber. It is placed around the periphery of the layup 30 and sealed to surface 25A by means of a vacuum bag sealant tape, indicated by numeral 33. During the sealing process, a tube 36 is inserted between the edge of the vacuum bag 32 and mold surface 25A. This in turn is connected to a vacuum pump 37. Finally, to improve efficiency, appropriate layers of insulation 38 are placed about the mold to reduce heat loss.

In operation, a vacuum is drawn between the envelope formed by the surface 25A and vacuum bag 32. This causes atmospheric pressure to compress the layup 30. Thereafter, the infrared lamps 26 are turned on and, since the glass mold 24 is generally transparent to the infrared radiation, most all the radiation is absorbed by the layup. This apparatus has the advantage over ceramic or graphite molds with cast in integral heaters because in the latter the whole mold must be heated prior to the melting of the composite layup.

Additionally, the assembly can be placed in an autoclave 40 (see FIG. 2) and pressure above atmospheric can be applied to compress the layup 30. If the moldable materials, such as resin impregnated KEVLAR aramide, do not effectively absorb infrared radiation then the one principle surface of the mold can be coated with an infrared absorbing material. For example, a solution containing carbon or graphite particles can be applied and thereafter dried. This coating is indicated in FIGS. 2 and 3 by the numeral 42.

Thus, it can be clearly seen that the method of molding comprises the following steps: 1) Providing a glass mold generally transparent to infrared radiation, with one of the principle surfaces for receiving the moldable materials; 2) Providing a stand for supporting the mold; 3) Laying up the moldable materials on the mold; 4) Vacuum bagging the layup forming an envelope thereabout which is evacuatable; 5) Drawing a vacuum from the envelope; and 6) Heating the layup from the opposite side of the mold by means of infrared radiation until the layup is molded. Again, it must be noted that if the moldable materials do not effectively absorb infrared radiation, then prior to the step of laying up the moldable materials the step of applying a coating of infrared absorbing materials must be accomplished.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability to the manufacturing of molded composites articles.

I claim:

1. An apparatus for making parts from moldable materials comprising:
    a glass mold having opposed principle surfaces, said mold being generally transparent to infrared radiation, one of said principle surfaces for receiving the moldable materials;
    a stand supporting said mold;
    infrared heating means positioned approximate to the other principle surface; vacuum bag means sealed to said one principle surface of said mold about the periphery, the moldable materials forming an evacuatable envelope about the molded materials;
    means to draw a vacuum from said envelope; and
    an infrared radiation reflector positioned behind said infrared heating means so as to reflect infrared radiation back toward said mold.

2. The apparatus as set forth in claim 1, wherein said glass mold is made of heat resistant glass.

3. An apparatus for making parts from moldable materials comprising:

a glass mold having opposed principle surfaces, said mold being generally transparent to infrared radiation, one of said principle surfaces for receiving the moldable materials;

a stand supporting said mold;

infrared heating means positioned approximate to the opposite principle surface; and an infrared radiation reflector positioned behind said infrared heating means so as to reflect infrared radiation back toward said mold.

4. The apparatus as set forth in claim 3, wherein said glass mold is made of heat resistant glass.

5. The apparatus as set forth in any of the claims 1 or 2 or 3 or 4, wherein, said one principle surface is coated with a layer of infrared absorbing material.

6. The apparatus as set forth in claim 5, wherein said infrared absorbing material is carbon.

7. The apparatus as set forth in claim 5, wherein said infrared absorbing material is graphite.

* * * * *